Dec. 18, 1934.  L. H. FISHER ET AL  1,984,969
COLLAR HOLDER
Filed June 16, 1933

WITNESSES
Edw. Thorpe
S. W. Foster

INVENTORS
Lyle H. Fisher
Alfred E. Galiani
BY
Munn, Anderson, Stanley, Foster & Liddy
ATTORNEY Patented Dec. 18, 1934

1,984,969

UNITED STATES PATENT OFFICE 1,984,969

COLLAR HOLDER

Lyle H. Fisher and Alfred E. Galiani, New York, N. Y.

Application June 16, 1933, Serial No. 676,165

1 Claim. (Cl. 24—81)

This invention relates to collar holders, and is more particularly adapted for holding the front ends of turned-over, soft and semi-soft collars so as to give the collar a neat, attractive appearance.

The primary object of our invention is to provide a collar holder which has at its ends manually operable clamping members which positively clamp and grip the collar and prevent possibility of accidental slipping or movement of the clamp and collar relative to each other.

We are aware of the fact that collar holders of this general type have heretofore been made with spring or resilient clamping means at the ends, which are apt to slip and free the collar and which frequently do slip and free the collar and fall out of position, especially when the collar is subjected to unusual strain. Furthermore, resilient clamps of this character eventually lose their efficiency; moreover, spring members of this kind must be forced on to the collar, whereas with our improved device the collar is freely positioned and then the manually operated clamping members are moved to clamping position to rigidly clamp the collar. These clamping members can be readily moved to unclamping or releasing position when desired to free the collar and allow the holder to be easily removed.

With these and other objects in view the invention consists in certain novel features of construction and arrangements of parts, all of which will be more fully hereinafter described and pointed out in the claim.

In the accompanying drawing,—

Figure 1:
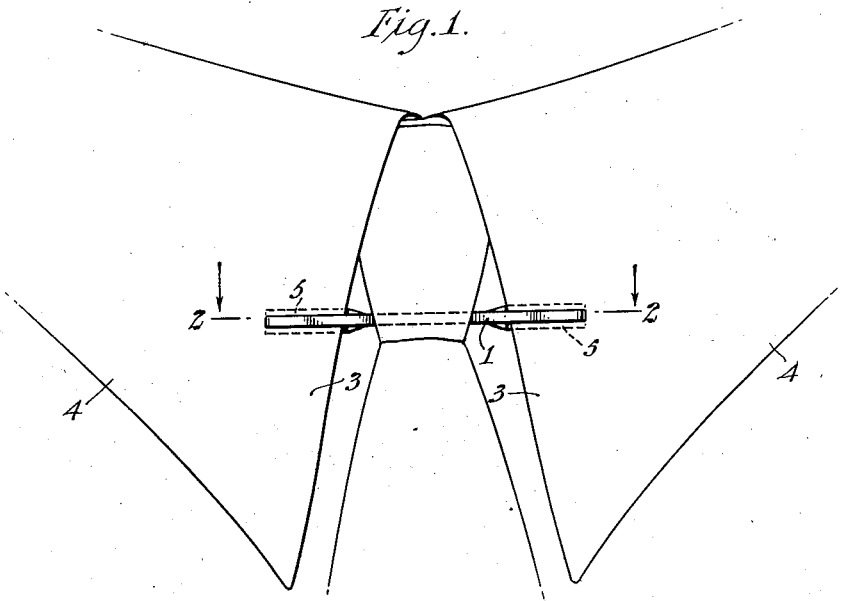
Figure 1 is a view in front elevation illustrating our improved collar holder in operative position.
Figure 2:
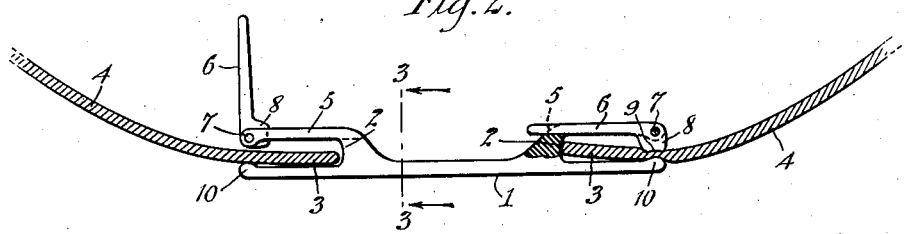
Figure 2 is an exaggerated view in section on the line 2—2 of Figure 1; a portion of the collar holder being broken away and one clamp shown in clamping position and the other in releasing position.
Figure 3:
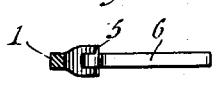
Figure 3 is a view in transverse section on the line 3—3 of Figure 2.
Figure 4:
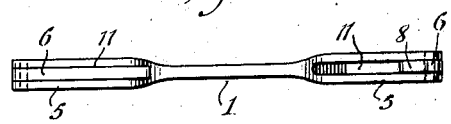
Figure 4 is a view in rear elevation of the collar holder showing one of the cam levers in clamping position and the other in releasing position.

1 represents a bar which is preferably of precious or semi-precious metal, and which is provided at both ends with bifurcated portions 2—2. The rear or inner furcation of each bifurcated portion is preferably laterally offset so that the front portion of the bar is preferably relatively straight throughout. These bifurcated portions are sufficiently large to permit the free entrance and removal of the front ends 3—3 of a collar 4 so as to permit the holder to be properly positioned relative to the front of the collar. The inner furcations 5 of both bifurcated ends support cam levers 6 which are pivotally secured to the furcations, as by means of pins 7. The cam ends 8 of these levers are preferably recessed or curved in shape, as shown at 9, to co-operate with enlargements 10 on the front furcations or extremities of the bar 1 to securely clamp the ends 3 of the collar in the bifurcated portions. The handle ends of these levers 6 are adapted, when the levers are in the clamping position, to be housed in recesses or slots 11 in the inner furcations 5. It will be noted particularly by reference to Figure 2 that the levers are sufficiently long to project beyond the bifurcated portions to allow for free engagement by the fingers of the operator to move the clamping levers from clamped to unclamped position. The clamping position is indicated at the right of Figure 2, where it can be noted that the collar is securely held, and the unclamping position is indicated at the left of Figure 2 where it can be observed that the collar has free movement in and out of the bifurcated end of the collar holder.

Figure 5:
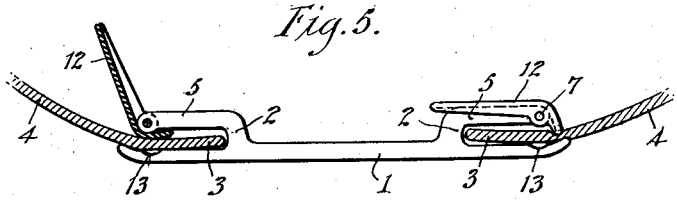
Figure 5 is a view similar to Figure 2 illustrating a modification.
Figure 6:
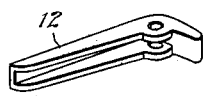
Figure 6 is a perspective view of one of the cam levers shown in Figure 5.

In the modification illustrated in Figures 5 and 6 of the drawing, cam levers 12, corresponding to cam levers 6 of the preferred form, are somewhat channel-shaped in cross section so that they straddle the inner furcation 5 instead of moving into recesesses or grooves, as illustrated in the preferred form; also in this modification it will be noted that the forward furcations have recesses 13 therein which permit of swinging movement of the cam levers without unduly clamping the collar until the cam levers reach a clamping position which is slightly past dead center, so that when the clamping levers are in their clamping position they cannot be moved out of clamping position by any strain on the collar.

The levers 6 and 12 have been referred to as cam levers because they function as cams to grip the collar when in one position and release the collar when in another position. However, it is distinctly understood that in employing this term "cam lever" it is employed in the broadest sense to include any pivoted swinging member which will clamp in one position and release in another, and while we have illustrated two forms of our invention it is obvious that various slight changes may be made in the general form and arrangement of parts without departing from the invention; hence we do not limit ourselves to the precise details set forth but consider ourselves at liberty to make such changes and alterations as fairly fall within the spirit and scope of the appended claim.

What we claim is:

A collar holder comprising a bar having bifurcated ends to receive a collar therein, cam levers carried by the inner furcations of said bifurcated ends, inwardly projecting portions at the extremities of the outer furcations co-operating with the cam levers to bite into a collar when the levers are in clamping position, said inwardly projecting portions constituting round enlargements, and said cam levers having curved recesses conforming in shape to the enlargements.

LYLE H. FISHER.
ALFRED E. GALIANI.